United States Patent [19]

Kawase et al.

[11] Patent Number: 5,012,838

[45] Date of Patent: May 7, 1991

[54] SOLENOID VALVE INCORPORATING LIQUID SURFACE DETECTING VALVE

[75] Inventors: Toshirou Kawase, Ibaraki; Shiro Saito; Masanobu Miyake, both of Tokyo, all of Japan

[73] Assignees: Kyosan Denki Kabushiki Kaisha; Fuji Jukogyo Kabushiki Kaisha, both of Tokyo, Japan

[21] Appl. No.: 525,762

[22] Filed: May 18, 1990

[30] Foreign Application Priority Data

Jul. 14, 1989 [JP] Japan .............................. 1-82225[U]

[51] Int. Cl.[5] ...................... F02M 33/08; F02M 37/20; F16K 31/06; F16K 31/22

[52] U.S. Cl. .................................... 137/202; 123/516; 123/520; 137/389; 137/433; 137/587; 137/614; 251/129.22

[58] Field of Search ................... 137/39, 43, 202, 389, 137/430, 433, 587, 588, 628, 613, 614, 614.19, 410; 141/59, 301; 123/516, 518, 519, 520; 220/85 VR, 85 VS; 222/67, 69, 318; 251/129.15, 129.22

[56] References Cited

U.S. PATENT DOCUMENTS

| | | | |
|---|---|---|---|
| 2,812,772 | 11/1957 | Moore | 137/202 |
| 3,256,900 | 6/1966 | Estes et al. | 251/129.22 |
| 3,334,645 | 8/1967 | Weinstein | 137/202 |
| 3,340,887 | 9/1967 | Peters | 137/202 |
| 3,407,827 | 10/1968 | Follett | 137/39 |
| 3,612,089 | 10/1971 | Beguiristain | 137/202 |
| 3,703,165 | 11/1972 | Hansen | 137/202 |
| 3,738,384 | 6/1973 | Hall | 137/512.3 |
| 3,796,227 | 3/1974 | Fujiwara | 137/202 |
| 3,860,026 | 1/1975 | Van den Koogh | 137/202 |
| 3,910,302 | 10/1975 | Sudhir | 137/43 |
| 4,258,685 | 3/1981 | Arai et al. | 123/520 |
| 4,376,446 | 3/1983 | Liff | 137/202 |
| 4,377,146 | 3/1983 | Oniki et al. | 123/520 |
| 4,432,328 | 2/1984 | Shimizu et al. | 123/516 |
| 4,815,436 | 3/1989 | Sasaki et al. | 137/51 |
| 4,925,155 | 5/1990 | Carman | 251/129.22 |

FOREIGN PATENT DOCUMENTS 62-53224 3/1987 Japan .

*Primary Examiner*—George L. Walton
*Attorney, Agent, or Firm*—Flynn, Thiel, Boutell & Tanis

[57] ABSTRACT

The present invention relates to a solenoid valve disposed over a fuel tank and incorporating a liquid surface detecting valve for detecting the liquid surface in a fuel tank. The solenoid valve comprises a plunger and an adhesion preventive pin wherein the adhesion preventive pin is lowered in the direction of the liquid surface detecting valve at the time of opening of the solenoid valve and the same pin pushes the liquid surface detecting valve downward at the time when the liquid surface detecting valve is attached and adhered to a valve seat thereof, whereby the liquid surface detecting valve is open with assurance.

4 Claims, 2 Drawing Sheets

SOLENOID VALVE INCORPORATING LIQUID SURFACE DETECTING VALVE

BACKGROUND OF THE INVENTION

1. Field of the Invention

The present invention relates to a solenoid valve disposed, for example, over a fuel tank and incorporating a liquid surface detecting valve for detecting the liquid surface in the fuel tank.

2. Description of the Prior Art

A conventional solenoid valve incorporating a liquid surface detecting valve is, for example, disclosed in Japanese Patent Laid-Open Publication No. 62-53224 and illustrated in FIG. 2 which comprises a solenoid valve 33 disposed in parallel with and in the midway of an exhaust passage 32 for exhausting fuel evaporative emission at an upper stream of the solenoid valve 33 and at the upper portion in a fuel tank 30.

In the fuel tank 30 provided with the solenoid valve 33 having a liquid surface detecting valve 34, the liquid surface detecting valve 34 is usually located at the position corresponding to the liquid surface in the tank 30 and the solenoid valve 33 is closed. Accordingly, when fuel supplied first in the tank 30 (hereinafter referred to as first fuel) is consumed, the liquid surface detecting valve 34 is lowered in response to the liquid surface and fuel evaporative emission of the first fuel in the tank 30 reaches the solenoid valve 33.

In case of the supply of new fuel or a second fuel into the tank 30 (hereinafter referred to as second fuel) accompanied by the consumption and reduction of the first fuel in the tank 30, the solenoid valve 33 is open synchronously with the supply of the second fuel, hence, fuel evaporative emission of the first fuel is fed to a canister 31 via the solenoid valve 33, whereby a pressure in the tank 30 is reduced to thereby permit the second fuel to be supplied into the tank 30. Upon completion of the supply of the second fuel, fuel in the tank 30 reaches an upper level of the tank 30 and the liquid surface detecting valve is closed to thereby increase the pressure in the tank 30 whereby the supply of the second fuel is stopped. The solenoid valve 33 is closed synchronously with the stop of the supply of the second fuel.

Whereupon, fuel has generally a viscosity. Accordingly, adhesive force is generated in both the liquid surface detecting valve 34 exposed to fuel evaporative emission and the valve seat thereof. Due to the adhesive force, even if the liquid surface is lowered, the liquid surface detecting valve 34 is liable to be kept attached or adhered to the valve seat thereof and thus not lowered in the tank whereby the liquid surface detecting valve 34 does not effectively operate at the time of the supply of the second fuel.

On the other hand, there is a need for making the size of the solenoid valve 33 as small as possible although it is necessary to enlarge the exhaust passage adjacent to the solenoid valve 33 in order to exhaust fuel evaporative emission as quickly as possible in the fuel tank 30 at the time of the supply of the second fuel so that the second fuel can be smoothly supplied.

SUMMARY OF THE INVENTION

It is therefore an object of the present invention to provide a solenoid valve incorporating a liquid surface detecting valve said capable of preventing the liquid surface detecting valve from adhering to a valve seat thereof at the time of the supply of fuel into the tank so that fuel evaporative emission can be quickly exhausted.

It is another object of the present invention to provide a solenoid valve incorporating a liquid surface detecting valve having a compact size and capable of operating accurately and quickly.

To achieve the above objects of the present invention, there is provided a solenoid valve composed of a plunger, a chamber having springs therein, and an adhesion preventive pin extending downward and having a tip end and a head wherein the plunger is disposed in an upper casing and the chamber is disposed in a middle casing connected to the upper casing, and a liquid surface detecting valve vertically movably housed in a lower casing, the tip end of the adhesion preventive pin being positionable under a valve seat on which the liquid surface detecting valve seats, characterized in that the resilience force of the springs is greater than the adhesive force generated when the liquid surface detecting valve is attached to the valve sent but less than the buoyant force generated when the liquid surface detecting valve floats.

The above and other objects, features and advantages of the present invention will become more apparent from the following description taken in conjunction with the accompanying drawings.

PREFERRED EMBODIMENT OF THE INVENTION

Figure 1:
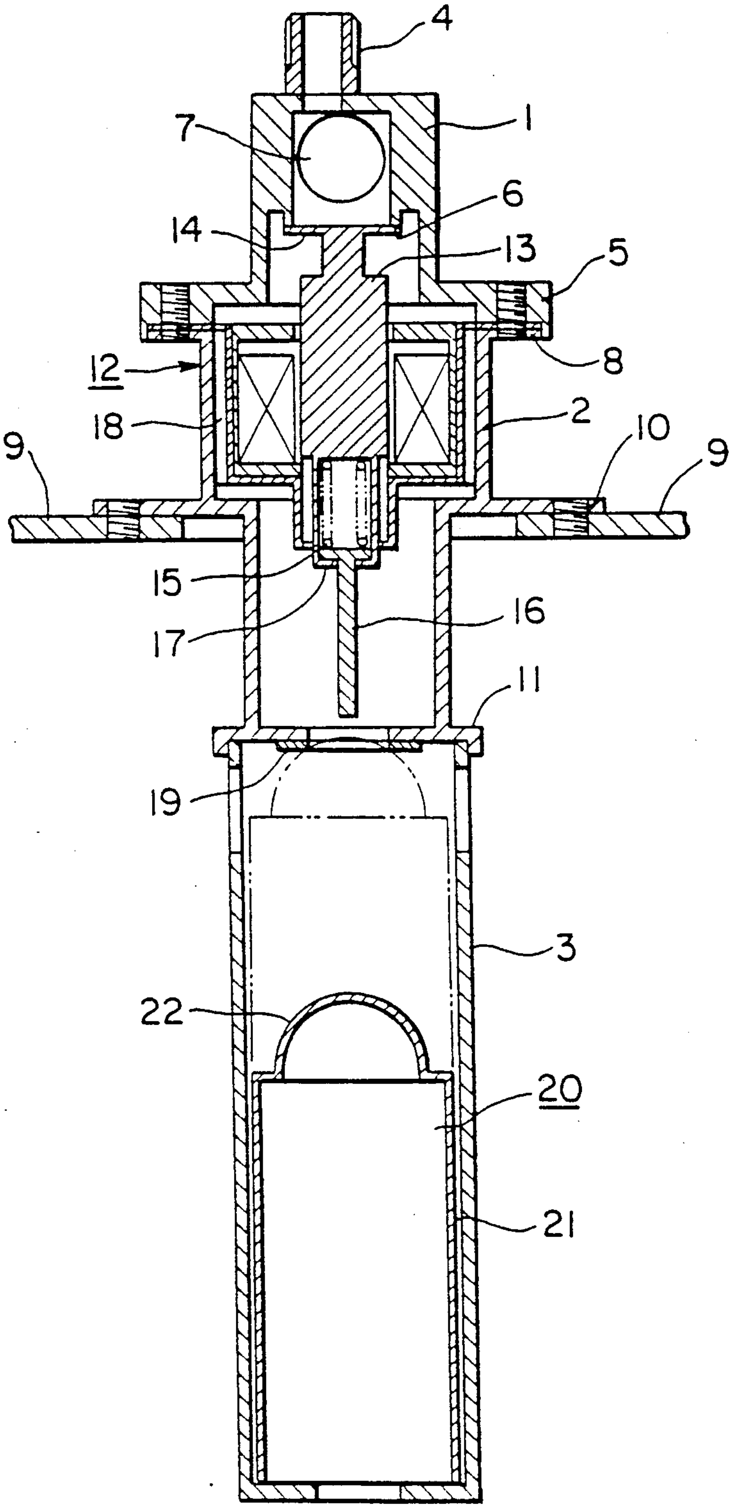
FIG. 1 is a cross sectional view of a solenoid valve incorporating a liquid surface detecting valve according to the present invention.
Figure 2:
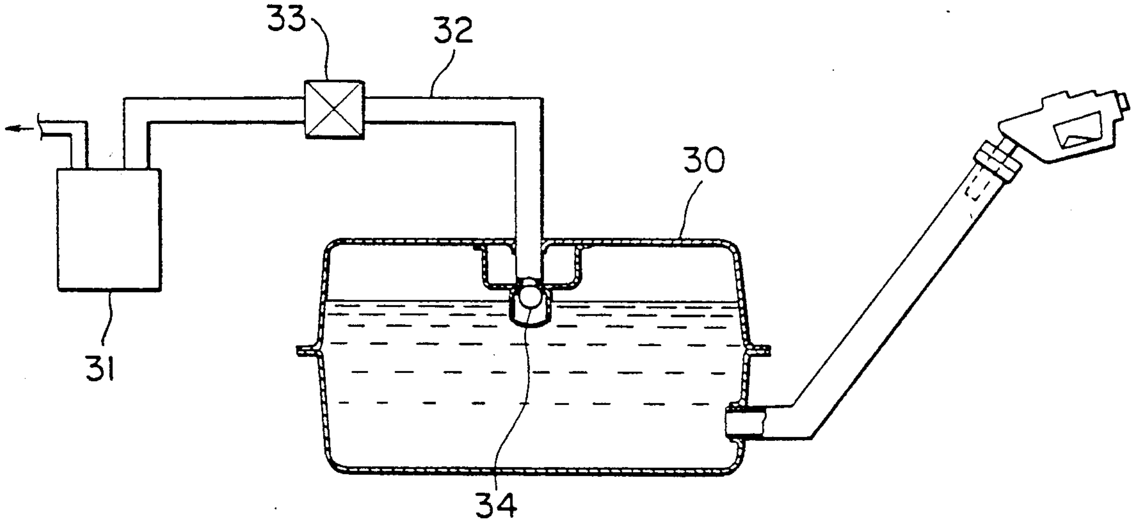
FIG. 2 (PRIOR ART)
FIG. 2 is a cross sectional view of a conventional solenoid valve incorporating a liquid surface detecting valve.

A solenoid valve incorporating a liquid surface detecting valve according to a preferred embodiment will be described with reference to FIG. 1.

The solenoid valve incorporating the liquid surface detecting valve comprises a solenoid valve 12 composed of a plunger 13 defined inside magnets of the solenoid valve 12, a chamber having springs 15 therein and defined under the lower portion of the plunger 13, and an adhesion preventive pin 16 extending downward and having a tip end and a head 17 which head 17 is housed in the chamber and urged usually by the springs 15 toward a lower surface of the chamber, the plunger 13 disposed in an upper casing 1 and the chamber disposed in a middle casing 2 connected to the upper casing 1, and a liquid surface detecting float valve 20 vertically movably housed in a lower casing 3 connected to the middle casing 2, and a valve seat 19 fixed to the lower portion of the middle casing 2 on which valve seat 19 the liquid surface detecting valve 20 rests, the tip end the adhesion preventive pin 16 being capable of extending under the valve seat 19 of the liquid surface detecting valve 20, and the solenoid valve 12 and the liquid surface detecting valve 20 being respectively disposed longitudinally in series, characterized in that the resilience force of the springs 15 is greater than the adhesive force generated when the liquid surface detecting valve 20 is attached or adhered to the valve seat 19 but less than the buoyant force generated when the liquid surface detecting valve 20 floats. FIG. 1 shows that the plunger 13 extends into the middle casing 2, wherein the magnets are also disposed.

The solenoid valve incorporating the liquid surface detecting valve will be described more in detail.

The upper casing 1 further comprises an exhaust pipe 4 provided at the upper surface thereof for exhausting a part of fuel evaporative emission, a valve seat 6 on which an upper surface of the plunger 13 usually rests, an exhaust passage 7 disposed over the valve seat 6 for exhausting fuel evaporative emission, and a flange 5 provided at a lower surface thereof for connecting with the middle casing 2. The middle casing 2 comprises an upper flange 8 engaged with the flange 5 of the upper casing 1, a middle flange 10 engaged with a fuel tank 9 and a lower flange 11 engaged with the lower casing 3. The middle casing 2 extends downwardly through an opening in the fuel tank 9. The lower casing 3 always communicates with fuel and fuel evaporative emission and has an upper end engaged with the lower flange 11 of the middle casing 2. An outer periphery of the solenoid valve 12 is spaced away from the inner periphery of the middle casing 2 to define an annular fuel evaporative emission passage 18. The flange 11 has the valve seat 19 provided at the lower side and at the central portion thereof on which valve seat 19 the liquid surface detecting valve 20 rests. The valve seat 19 surrounds a valve opening in flange 11, which valve opening communicates the interiors of the casings 2 and 3. The adhesion preventive pin 16 extends downward toward the liquid surface detecting valve 20 and has such a predetermined length that the tip end of adhesion preventive pin 16 can be positioned under the valve seat 19 of the liquid surface detecting valve 20 at the time of opening the solenid valve 12 due to lowering of the plunger 13 when the solenoid valve 12 is energized.

The lower casing 3 engaged with the lower flange 11 of the middle casing 2 has many holes and grooves at peripheral surfaces thereof and an inner space always communicating with fuel or fuel evaporative emission in the fuel tank 9. The liquid surface detecting valve 20 is movably disposed in the inner space of the lower casing 3. The liquid surface detecting valve 20 comprises a cylindrical barrel 21 and a hemispherical valve head 22 respectively made of thin synthetic resins and the like.

The solenoid valve 12 is combined or integrated with the liquid surface detecting valve 20 and fixed to the upper surface of the fuel tank 9 by the middle flange 10. This integrated solenoid valve, namely, the solenoid valve incorporating the liquid surface detecting valve is operated as follows.

In case of the supply of new fuel into the fuel tank 9, the tip end of the adhesion preventive pin 16 is lowered under the valve seat 19 of the liquid surface detecting valve 20 accompanied by lowering of the plunger 13. Hence, even if the valve head 22 of the liquid surface detecting valve 20 is kept attached to or adhered to the valve seat 19, the tip end of the adhesion preventive pin 16 is brought into contact with the valve head 22, thereby pressing the liquid surface detecting valve 20 downward. The pressing force of the adhesion preventive pin 16 corresponds to the resilience force of the springs 15. Inasmuch as the resilience force of the springs 15 set to be greater than the adhesive force generated by adhesion of the liquid surface detecting valve 20 to the valve seat 19, the valve head 22 of the liquid surface detecting valve 20 is pressed down and moved away from the valve seat 19. Accordingly, fuel evaporative emission in the fuel tank 9 passes from the valve seat 19 via the annular fuel evaporative emission passage 18 provided at the outer periphery of the solenoid valve 12, the valve portion 6 of the solenoid valve 12 and the exhaust passage 7, and is fed to the canister (not shown). Part of the fuel evaporative emission passes through the exhaust passage and the exhaust pipe 4, and is returned to the fuel tank 9 an unillustrated pipe. The solenoid valve incorporating the liquid surface detecting valve is thus normally operated.

In case of increasing of fuel which reaches a top or full level in the fuel tank 9, the valve head 22 of the liquid surface detecting valve 20 is brought into contact with the tip end of the adhesion preventive pin 16 and presses it upward. The pressing force generated in the liquid surface detecting valve 20 is buoyant force generated in the liquid surface detecting valve 20. Inasmuch as the resilience force of the springs 15 is set to be less than the buoyant force, the valve head 22 of the liquid surface detecting valve 20 pushes the adhesion preventive pin 16 upwardly so that the adhesion preventive pin 16 is positioned above the valve seat 19 and the valve head 22 rests on the valve seat 19 whereby the liquid surface detecting valve 20 is closed. Accompanied by closing of the liquid surface detecting valve 20, pressure in the tank 19 is increased so that any fuel can not be supplied in the fuel tank 19. The solenoid valve 12 is closed in synchronism with the stop of the supply of fuel in the fuel tank.

The arrangement of the solenoid valve incorporating the liquid surface detecting valve according to the present invention has the following advantages.

Even if the liquid surface detecting valve rests on the valve seat in case of the supply of new fuel, the adhesion preventive pin is interlocked with lowering operation of the plunger and is lowered to press the liquid surface detecting valve downward so that the liquid surface detecting valve 20 is immediately moved away from the valve seat. In case that the liquid surface in the fuel tank reaches the top or full level of the fuel tank, the liquid surface detecting valve causes the adhesion preventive pipe to return upwardly with ease and is closed so that the liquid surface detecting valve is always accurately operated.

In case of the supply of new fuel into the fuel tank, fuel evaporative emission in the tank is fed to the canister through the outer periphery of the solenoid valve by opening the solenoid valve. At this time, even if the gap between the outer periphery of the solenoid valve and the inner periphery of the middle casing is relatively small since the fuel evaporative emission passage is provided at the outer periphery of the solenoid valve, cross section of the fuel evaporative emission passage is substantially greater so that fuel evaporative emission is quickly exhausted. Furthermore, inasmuch as the gap between the outer periphery of the solenoid valve and the inner periphery of the middle casing is relatively set to be small, it is possible to reduce the diameter of the casings of the solenoid valve which entails to reduce the size of the overall structure of the solenoid valve incorporatng the liquid surface detecting valve.

Although the invention has been described in its preferred form with a certain degree of paticularity, it is to be understood that many variations and changes are possible in the invention without departing from the scope thereof.

What is claimed is:

1. An apparatus for discharging evaporate fuel emissions from a fuel tank, comprising:

a first hollow casing attached to the fuel tank;

a second hollow casing connected to a lower end of said first casing and extending downwardly into the interior of the fuel tank through an opening therein, means defining a valve opening which extends through said first and second casings for communicating the interior of said first casing with the interior of said second casing, a downwardly facing valve seat disposed in surrounding relationship to said valve opening, said second casing having a hole therein for communicating the interior of said second casing with the interior of fuel tank;

said first casing defining therein an exhaust passage for communicating said valve opening with a point located exteriorly of said first and second casings and the fuel tank;

a solenoid valve including magnet means supported in said first casing, and a plunger movably supported inside said magnet means for vertically reciprocal movement relative to said casings;

said plunger having closure means provided thereon for permitting closing of said exhaust passage in response to movement of said plunger to an operative position;

a freely floatable valve member disposed in said second casing for vertical floating movement relative thereto, said floatable valve member being vertically displaced by liquid fuel in said second casing to an elevation which corresponds to the level of liquid fuel in the fuel tank, said floatable valve member having a valve head which is adapted to seat upwardly against said downwardly facing valve seat and block said valve opening when said freely floating valve member reaches a predetermined elevation;

an elongated pin depending downwardly from said plunger and supported for movement therewith, said elongate pin being disposed in overlying relationship to said valve opening and being long enough to contact and displace the valve head downwardly away from the valve seat when said plunger is in a lower operative position and said exhaust passage is open for communication between said valve opening and said exteriorly located point;

spring means coacting between said pin and said plunger for yieldably urging said pin downwardly relative to said plunger and permitting relative movement of said pin and said plunger toward each other, said spring means applying to said pin a downwardly directed resilient force which is greater than an adhesive force which, due to the viscosity of the liquid fuel, tends to adhere said valve head to said valve seat but less than an upwardly directed buoyant force associated with an upward displacement of said floatable valve member by the liquid fuel in the fuel tank, said downwardly spring-urged elongate pin being operable when said plunger moves to said lower operative position to forcibly downwardly remove said valve head from adherence to said valve seat, and said downwardly spring-urged elongated pin being upwardly yieldable when contacted by said valve head during upward floating movement of said floatable valve member to permit said valve head to seat upwardly against said valve seat and interrupt communication between the interiors of said first and second casings when the liquid fuel reaches a predetermined level.

2. An apparatus according to claim 1, wherein said closure means includes an upwardly facing surface of said plunger, said first casing defining therein a further downwardly facing valve seat which cooperates with said upwardly facing plunger surface to close said exhaust passage when said plunger is in said upper operative position.

3. An apparatus according to claim 1, wherein said first casing includes a lower part secured to an upper surface of the fuel tank, and an upper part secured to an upper end of said lower part, said solenoid valve being disposed in inwardly spaced relationship from an inner surface of said lower part, said exhaust passage being defined in part between said solenoid valve and said inner surface of said lower part.

4. An apparatus for discharging evaporative fuel emissions from a fuel tank, comprising:

a hollow casing attached to the fuel tank, means including openings extending through said hollow casing and said fuel tank for providing communication between the interior of said hollow casing and the interior of said fuel tank, a downwardly facing valve seat disposed in surrounding relationship to one said opening, said hollow casing defining therein an exhaust passage for communicating said one opening with a point located exteriorly of said hollow casing and said fuel tank;

a solenoid valve including a magnet means supported in said hollow casing and a plunger movably supported inside said magnet means for vertically reciprocal movement relative to said casing, said plunger having closure means thereon for permitting closing of said exhaust passage in response to movement of said plunger to an upper operative position;

a freely floatable valve member disposed in said fuel tank for vertical floating movement relative thereto, said floatable valve member being adapted to float on liquid fuel in said fuel tank for vertical displacement to an elevation which corresponds to the level of liquid fuel in said fuel tank, said floatable valve member having a valve head which is adapted to seat upwardly against said valve seat and close said one opening when said floatable valve member reaches a predetermined elevation;

an elongated pin depending downwardly from said plunger and supported for movement therewith, said elongate pin being disposed in overlying relationship relative to said one opening and being long enough to contact and displace the valve head downwardly away from the valve seat when said plunger is in a lower operative position and siad exhaust passage is open for communication between said valve opening and said exteriorly located point; and spring means coacting between said pin and said plunger for yieldably urging said pin downwardly and permitting relative movement of said pin and said plunger toward each other, said spring means applying to said pin a downwardly directed resilient force which is greater than an adhesive force which, due to the viscosity of the liquid fuel, tends to adhere said valve head to said valve seat but is less than an upwardly directed buoyant force associated with an upward displacement of said floatable valve member by liquid fuel in said fuel tank, said downwardly spring-urged elongate pin being operable when said plunger moves to said lower operative position to forcibly downwardly remove said valve had from adherence to said valve seat, and said downwardly spring-urged elongate pin being yieldable upwardly when contacted by said valve head during upward floating movement of said floatable valve member to permit said valve head to seat upwardly against said valve seat and interrupt communication between the interiors of said hollow casing and said fuel tank when the liquid fuel reaches a predetermined level.

* * * * *

UNITED STATES PATENT AND TRADEMARK OFFICE
CERTIFICATE OF CORRECTION

PATENT NO. : 5 012 838

DATED : May 7, 1991

INVENTOR(S) : Toshirou Kawase et al

It is certified that error appears in the above-identified patent and that said Letters Patent is hereby corrected as shown below:

Column 5, line 25; after "an" insert ---upper---.

Column 5, line 47; after "point;" insert ---and---.

Signed and Sealed this

Fifteenth Day of December, 1992

*Attest:*

DOUGLAS B. COMER

*Attesting Officer*

*Acting Commissioner of Patents and Trademarks*